US012318353B2

(12) United States Patent
Wurm

(10) Patent No.: US 12,318,353 B2
(45) **Date of Patent: *Jun. 3, 2025**

(54) HOUSING FOR A FLEXIBLE CONTAINER

(71) Applicant: Single Use Support GmbH, Kufstein (AT)

(72) Inventor: Thomas Wurm, Stumm (AT)

(73) Assignee: Single Use Support GmbH, Kufstein (AT)

( * ) Notice: Subject to any disclaimer, the term of this patent is extended or adjusted under 35 U.S.C. 154(b) by 41 days.

This patent is subject to a terminal disclaimer.

(21) Appl. No.: 18/095,082

(22) Filed: Jan. 10, 2023

(65) Prior Publication Data

US 2023/0157928 A1 May 25, 2023

Related U.S. Application Data

(60) Continuation of application No. 17/508,008, filed on Oct. 22, 2021, now Pat. No. 11,602,487, which is a (Continued)

(30) Foreign Application Priority Data

Jan. 16, 2017 (AT) .............................. A 60004/2017
May 24, 2017 (AT) .................................. 50100/2017

(51) Int. Cl.
*A61J 1/16* (2023.01)
*A61J 1/10* (2006.01)
(Continued)

(52) U.S. Cl.
CPC ............. *A61J 1/165* (2013.01); *A61J 1/1468* (2015.05); *B65D 25/14* (2013.01); *B65D 77/06* (2013.01); *B65D 81/022* (2013.01); *A61J 1/10* (2013.01)

(58) Field of Classification Search
CPC .... A61J 1/10; A61J 1/14; A61J 1/1468; A61J 1/16; A61J 1/165; B65D 25/10;
(Continued)

(56) References Cited

U.S. PATENT DOCUMENTS 4,723,974 A 2/1988 Ammerman
4,738,364 A 4/1988 Yeager
(Continued)

FOREIGN PATENT DOCUMENTS

CN 102991815 3/2013
CN 203959080 11/2014
(Continued)

OTHER PUBLICATIONS

Search Report issued Jan. 24, 2018 in Austrian Application No. GM 50100/2017, with English translation.
(Continued)

*Primary Examiner* — Bryon P Gehman
(74) *Attorney, Agent, or Firm* — Wenderoth, Lind & Ponack, L.L.P.

(57) ABSTRACT

An arrangement includes a housing and a flexible container. The flexible container is arranged in the housing and filled with a medicine or another liquid which occurs in a pharmaceutical production process. The housing is at least partially lined with an elastic foam configured to compensate for an increase in volume of the flexible container that occurs upon freezing.

114 Claims, 1 Drawing Sheet

Related U.S. Application Data division of application No. 16/373,177, filed on Apr. 2, 2019, now Pat. No. 11,207,239, which is a continuation of application No. PCT/AT2018/060010, filed on Jan. 15, 2018.

(51) Int. Cl.

| | |
|---|---|
| ***A61J 1/14*** | (2023.01) |
| ***B65D 25/14*** | (2006.01) |
| ***B65D 77/06*** | (2006.01) |
| ***B65D 81/02*** | (2006.01) |

(58) Field of Classification Search

CPC ........ B65D 25/14; B65D 77/02; B65D 77/06; B65D 81/02; B65D 81/022; B65D 81/24; B65D 81/113; F25D 3/08

See application file for complete search history.

(56) References Cited

U.S. PATENT DOCUMENTS

| | | | | |
|---|---|---|---|---|
| 6,381,981 | B1 | 5/2002 | Yaddgo | |
| 6,401,484 | B2 | 6/2002 | Gano | |
| 6,554,133 | B1 | 4/2003 | Kropf | |
| 7,240,513 | B1 | 7/2007 | Conforti | |
| 7,278,278 | B2 | 10/2007 | Wowk | |
| 8,146,762 | B2 | 4/2012 | Leoncavallo et al. | |
| 8,177,123 | B2 | 5/2012 | Voute | |
| 8,905,255 | B2 | 12/2014 | Leoncavallo et al. | |
| 9,301,520 | B2 | 4/2016 | Cutting | |
| 9,950,830 | B2 | 4/2018 | de Lesseux | |
| 11,542,085 | B2 * | 1/2023 | McCormick | B65D 81/022 |
| 2004/0045861 | A1 | 3/2004 | Curry et al. | |
| 2007/0056970 | A1 * | 3/2007 | Scherer | B65D 25/14 220/62.22 |
| 2007/0209960 | A1 | 9/2007 | Leoncavallo et al. | |
| 2009/0193765 | A1 * | 8/2009 | Lantz | B65D 81/05 220/592.2 |
| 2012/0152943 | A1 | 6/2012 | Leoncavallo et al. | |
| 2015/0305978 | A1 | 10/2015 | Cook et al. | |

FOREIGN PATENT DOCUMENTS

| | | |
|---|---|---|
| DE | 2 258 163 | 6/1974 |
| DE | 101 55 150 | 5/2003 |
| EP | 0 397 607 | 11/1990 |
| EP | 1 396 440 | 3/2004 |
| GB | 2 383 402 | 6/2003 |
| NL | 8501555 | 12/1986 |

OTHER PUBLICATIONS

International Search Report issued Mar. 20, 2018 in International (PCT) Application No. PCT/AT2018/060010.

* cited by examiner

HOUSING FOR A FLEXIBLE CONTAINER

BACKGROUND OF THE INVENTION

The present invention concerns a housing for a flexible container for transporting liquids, in particular medicines. In addition to medicines other liquids which occur in the (bio)pharmaceutical production process can also be transported by a flexible container in such a housing.

Flexible containers with which medicines are transported in a housing are also referred to as "single use bags". This is usually done in a frozen state, wherein the flexible container is placed in the housing before freezing. The liquid is then frozen by cooling the assembly.

The expansion in volume during freezing (about 8%) creates a pressure that is not to be underestimated on the housing and the flexible container. This entails the risk of mechanical damage and consequently leaks in the mechanical container.

The object of the present invention is to reduce the mechanical stress on the flexible container and the housing in relation to the state of the art upon freezing.

SUMMARY OF THE INVENTION

The above object is effected by an elastic foam—in other words, by at least one body of elastic foam—with which the housing is lined. In particular that can at least partially—preferably substantially completely—compensate for the increase in volume of the container arranged in the housing, that occurs during freezing. Protection is also sought for an arrangement comprising a housing according to the invention and a flexible container which is arranged therein and is filled with a liquid, in particular a medicine.

In addition, protection is sought for the use of a housing according to the invention, wherein a liquid, in particular a drug. is put into the flexible container, the filled container is disposed in the housing and the liquid is frozen by cooling the arrangement consisting of housing and container.

Liquids which can be transported in the flexible container are for example protein solutions, end products from a purification procedure, antibody solutions and other high-value intermediate products in the pharmaceutical production cycle, and naturally medicines themselves.

A preferred embodiment may be one in which the foam has decreasing elasticity with a decreasing temperature below the freezing point. It can also be provided that the foam substantially hardens at a temperature between 0° C. to −30° C., preferably between −5° C. and −25° C. and particularly preferably between −10° C. and −20° C., These measures can contribute to ensuring that the flexible container in the housing lies in a precisely adapted "bed" in the housing. All forces acting on the flexible container and the housing are thereby absorbed by larger surfaces. Damage caused by clamping or the like is thereby at least reduced, if not completely excluded.

In a particularly preferred embodiment, the foam is such that the hardening process is reversible. Upon an increase in the temperature of the assembly after transport, the elasticity of the foam is thus restored and thus affords a certain degree of protection from effects acting on the flexible container when it is removed from the housing. In addition, by virtue of by the reversible process, the housing can in principle be reused, if desired.

Hardening of the foam may also be referred to as becoming essentially inelastic. This does not involve curing in the production of the foam, but the change in the elasticity properties under the effect of cold.

In a particularly preferred embodiment, the housing is lined with the foam in such a way that the container—preferably including any attachments—is completely surrounded by the foam when the container is arranged in the housing. In that way not only the flexible container but also the attachments can be even better protected from damage.

As attachments for such flexible containers are often of differing shapes, because for example they comprise deformable tubes and the like, a foam block in the housing may be advantageous, which can receive the attachments (by deformation).

The housing may be of a substantially cuboidal configuration. This can facilitate for example easy stacking of the housings.

It can also happen that containers have to be transported, that have not been completely filled. In this case an additional layer of foam can be used, whereby in this case too a "bed" filling the volume of the housing is created for the flexible container.

BRIEF DESCRIPTION OF DRAWINGS

Further advantages and details of the invention will be apparent from the Figures and the associated specific description. In the Figures.

DETAILED DESCRIPTION OF THE INVENTION

Figure 1:
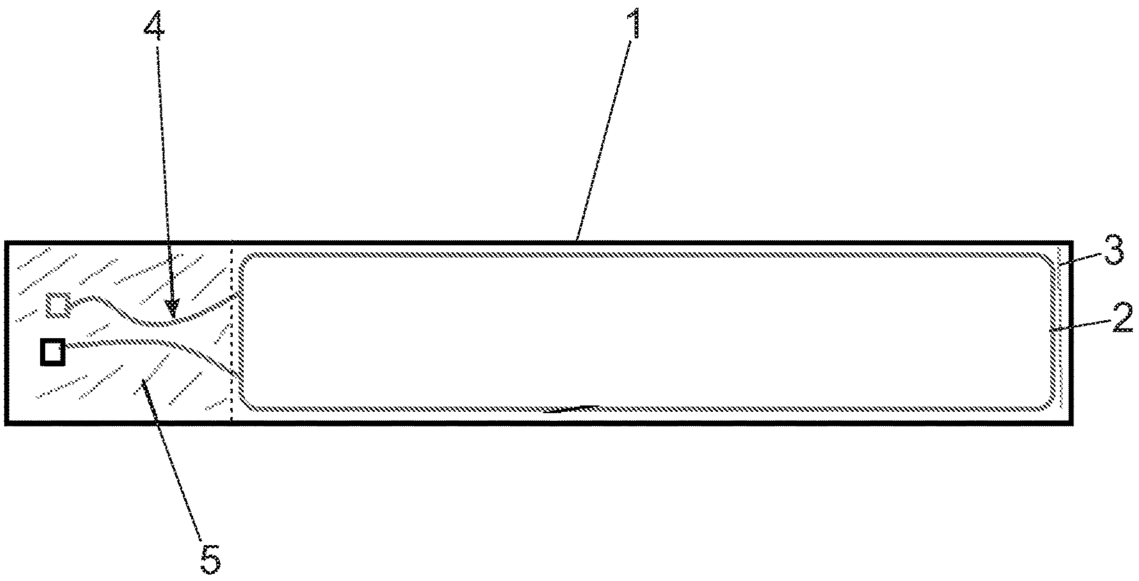
FIG. 1 is a sectional side view of a housing according to the invention with flexible container disposed therein.
Figure 2:
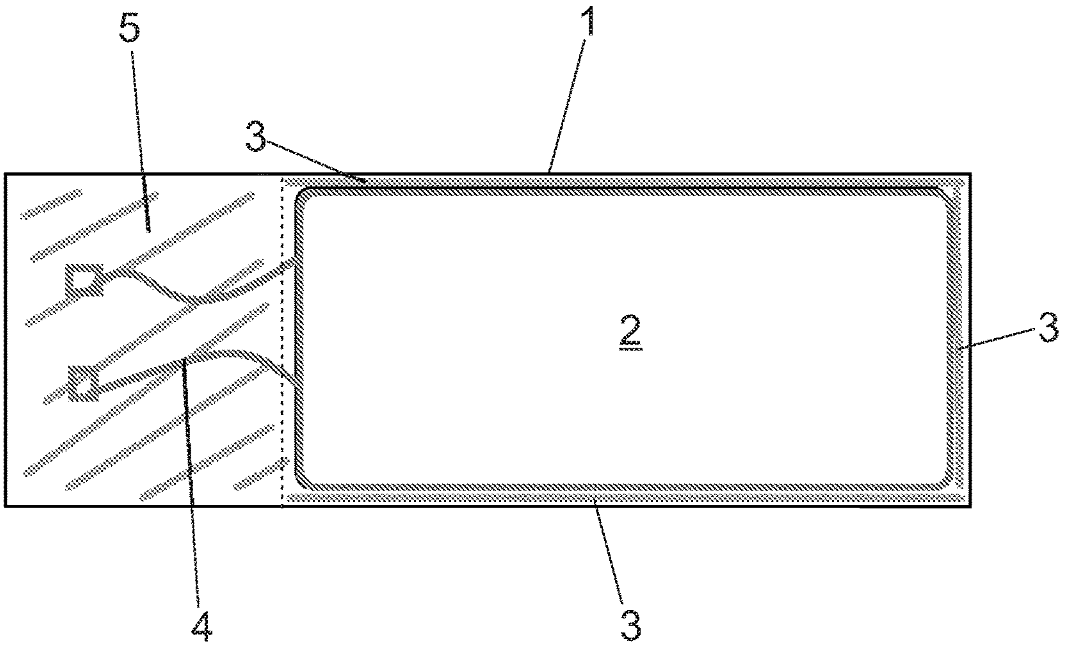
FIG. 2 is a sectional plan view thereof.

As can be seen from FIGS. 1 and 2 the flexible container 2 is arranged within the housing 1. In this case the housing 1 is lined with foam 3 and a foam block 5. When the liquid within the container 2 freezes the container 2 expands. That increase in volume is absorbed by the foam 3 and the foam block 5 so that no stress—or at least not a significant one—arises between the container 2 and the housing 1. Attachments 4, for example hoses and valves and the like, are arranged above or within the foam block 5 which by virtue of its elasticity or flexibility can accommodate same.

In the present embodiment the housing 1 is of a completely enclosing design. The housing 1 may comprise plastics and/or metal. In the present embodiment the cover layers are each made from stainless steel and the side walls are made of a polyethylene (specifically: high density polyethylene, HDPE).

The completely closed design of the housing 1 ensures access protection for the container 2. Theoretically it would also be possible fit a closure or a seal whereby manipulation during the transport process or in the warehouse can be excluded or at least rendered visible.

The foam 3 may preferably be such that it is relatively yielding and flexible at room temperature (and slight negative temperatures) and hardens at lower temperatures (−15° C. and colder) and encloses the container 2 arranged in the housing 1 and protects it from relative movement. The container 2 protected in that way can accordingly not be bent or compressed because relative movement with respect to the housing 1 is indeed prevented. As a result cracks and leaks can be prevented on the container 2 which for example is made of plastic.

The foam used for example can be so-called visco-elastic foam which hardens at certain negative temperatures.

Freezing of the arrangement of housing 1 and filled container 2 can be effected for example by contact cooling or circulatory air cooling systems or in some other way. In contact cooling systems the cover surfaces of the housing 1 (also referred to as "shell") lie against cooled surfaces. In circulatory air cooling systems cooled air flows around the housing 1.

The individual sides of the housing 1, in particular the cover surfaces (that is to say top and bottom), can be made of relatively thin material, in particular steel, in order to achieve fast heat conduction (or cold conduction).

The housing 1 according to the invention—as already mentioned—can be reused, in particular if the foam 3 is such that hardening at low temperatures is reversible. It will be appreciated that one-off use of the housing 1 is also conceivable. For that purpose the housing 1 can be easy to strip down for simple recycling measures.

The invention claimed is:

1. An arrangement comprising:

a housing; and a flexible container, wherein:

the flexible container is arranged in the housing and configured to be filled with a liquid which occurs in a pharmaceutical production process; and the housing is at least partially lined with an elastic foam configured to compensate for an increase in volume of the flexible container that occurs upon freezing.

2. The arrangement of claim 1, wherein the elastic foam is configured to completely compensate for the increase in volume of the flexible container that occurs upon freezing.

3. The arrangement of claim 1, wherein the elastic foam has decreasing elasticity with decreasing temperature below a freezing point.

4. The arrangement of claim 1, wherein a hardening of the elastic foam occurs at a temperature between 0 degrees Celsius to −30 degrees Celsius.

5. The arrangement of claim 4, wherein the hardening is reversible.

6. The arrangement of claim 1, wherein a hardening of the elastic foam occurs at a temperature between −5 degrees Celsius and −25 degrees Celsius.

7. The arrangement of claim 6, wherein the hardening is reversible.

8. The arrangement of claim 1, wherein a hardening of the elastic foam occurs at a temperature between −10 degrees Celsius and −20 degrees Celsius.

9. The arrangement of claim 8, wherein the hardening is reversible.

10. The arrangement of claim 1, wherein the flexible container is completely surrounded by the elastic foam.

11. The arrangement of claim 1, further comprising:

at least one attachment for the flexible container, wherein the flexible container and the at least one attachment are completely surrounded by the elastic foam.

12. The arrangement of claim 1, further comprising:

at least one attachment for the flexible container; and a foam block in the housing for receiving the at least one attachment.

13. The arrangement of claim 1, wherein the housing is cuboidal.

14. The arrangement of claim 1, wherein the liquid is a medicine.

15. The arrangement of claim 1, wherein the housing comprises cover layers made of metal.

16. The arrangement of claim 15, wherein the metal is stainless steel.

17. The arrangement of claim 1, wherein the housing is completely enclosed.

18. The arrangement of claim 1, wherein the housing encloses the flexible container.

19. The arrangement of claim 1, wherein the elastic foam encloses the flexible container.

20. A housing comprising:

a body configured to hold a flexible container for a liquid which occurs in a pharmaceutical production process, wherein the housing is at least partially lined with an elastic foam configured to compensate for an increase in volume of the flexible container that occurs upon freezing.

21. The housing of claim 20, wherein the elastic foam is configured to completely compensate for the increase in volume of the flexible container that occurs upon freezing.

22. The housing of claim 20, wherein the elastic foam has decreasing elasticity with decreasing temperature below a freezing point.

23. The housing of claim 20, wherein a hardening of the elastic foam occurs at a temperature between 0 degrees Celsius to −30 degrees Celsius.

24. The housing of claim 23, wherein the hardening is reversible.

25. The housing of claim 20, wherein a hardening of the elastic foam occurs at a temperature between −5 degrees Celsius and −25 degrees Celsius.

26. The housing of claim 25, wherein the hardening is reversible.

27. The housing of claim 20, wherein a hardening of the elastic foam occurs at a temperature between −10 degrees Celsius and −20 degrees Celsius.

28. The housing of claim 27, wherein the hardening is reversible.

29. The housing of claim 20, wherein the elastic foam is configured to completely surround the flexible container.

30. The housing of claim 20, further comprising:

at least one attachment for the flexible container, wherein the elastic foam is configured to completely surround the flexible container and the at least one attachment.

31. The housing of claim 20, further comprising:

at least one attachment for the flexible container; and a foam block in the housing for receiving the at least one attachment.

32. The housing of claim 20, wherein the housing is cuboidal.

33. The housing of claim 20, wherein the liquid is a medicine.

34. The housing of claim 20, further comprising cover layers made of metal.

35. The housing of claim 34, wherein the metal is stainless steel.

36. The housing of claim 20, wherein the housing is completely enclosed.

37. The housing of claim 20, wherein the housing is configured to enclose the flexible container.

38. The housing of claim 20, wherein the elastic foam is configured to enclose the flexible container.

39. An arrangement comprising:

a housing; and a flexible container, wherein:

the flexible container is arranged in the housing and configured to be filled with a liquid which occurs in a pharmaceutical production process; and the housing is at least partially lined with an elastic foam configured to absorb expansion of the flexible container.

40. The arrangement of claim 39, wherein the elastic foam is configured to completely absorb expansion of the flexible container that occurs upon freezing.

41. The arrangement of claim 39, wherein the elastic foam has decreasing elasticity with decreasing temperature below a freezing point.

42. The arrangement of claim 39, wherein a hardening of the elastic foam occurs at a temperature between 0 degrees Celsius to −30 degrees Celsius.

43. The arrangement of claim 42, wherein the hardening is reversible.

44. The arrangement of claim 39, wherein a hardening of the elastic foam occurs at a temperature between −5 degrees Celsius and −25 degrees Celsius.

45. The arrangement of claim 44, wherein the hardening is reversible.

46. The arrangement of claim 39, wherein a hardening of the elastic foam occurs at a temperature between −10 degrees Celsius and −20 degrees Celsius.

47. The arrangement of claim 46, wherein the hardening is reversible.

48. The arrangement of claim 39, wherein the flexible container is completely surrounded by the elastic foam.

49. The arrangement of claim 39, further comprising:

at least one attachment for the flexible container, wherein the flexible container and the at least one attachment are completely surrounded by the elastic foam.

50. The arrangement of claim 39, further comprising:

at least one attachment for the flexible container; and a foam block in the housing for receiving the at least one attachment.

51. The arrangement of claim 39, wherein the housing is cuboidal.

52. The arrangement of claim 39, wherein the liquid is a medicine.

53. The arrangement of claim 39, wherein the housing comprises cover layers made of metal.

54. The arrangement of claim 53, wherein the metal is stainless steel.

55. The arrangement of claim 39, wherein the housing is completely enclosed.

56. The arrangement of claim 39, wherein the elastic foam encloses the flexible container.

57. The arrangement of claim 39, wherein the elastic foam encloses the flexible container.

58. A housing comprising:

a body configured to hold a flexible container for a liquid which occurs in a pharmaceutical production process, wherein the housing is at least partially lined with an elastic foam configured to absorb expansion of the flexible container.

59. The housing of claim 58, wherein the elastic foam is configured to completely absorb expansion of the flexible container that occurs upon freezing.

60. The housing of claim 58, wherein the elastic foam has decreasing elasticity with decreasing temperature below a freezing point.

61. The housing of claim 58, wherein a hardening of the elastic foam occurs at a temperature between 0 degrees Celsius to −30 degrees Celsius.

62. The housing of claim 61, wherein the hardening is reversible.

63. The housing of claim 58, wherein a hardening of the elastic foam occurs at a temperature between −5 degrees Celsius and −25 degrees Celsius.

64. The housing of claim 63, wherein the hardening is reversible.

65. The housing of claim 58, wherein a hardening of the elastic foam occurs at a temperature between −10 degrees Celsius and −20 degrees Celsius.

66. The housing of claim 65, wherein the hardening is reversible.

67. The housing of claim 58, wherein the elastic foam is configured to completely surround the flexible container.

68. The housing of claim 58, further comprising:

at least one attachment for the flexible container, wherein the elastic foam is configured to completely surround the flexible container and the at least one attachment.

69. The housing of claim 58, further comprising:

at least one attachment for the flexible container; and a foam block in the housing for receiving the at least one attachment.

70. The housing of claim 58, wherein the housing is cuboidal.

71. The housing of claim 58, wherein the liquid is a medicine.

72. The housing of claim 58, further comprising cover layers made of metal.

73. The housing of claim 72, wherein the metal is stainless steel.

74. The housing of claim 58, wherein the housing is completely enclosed.

75. The housing of claim 58, wherein the housing is configured to enclose the flexible container.

76. The housing of claim 58, wherein the elastic foam is configured to enclose the flexible container.

77. An arrangement comprising:

a housing; and a flexible container, wherein:

the flexible container is arranged in the housing and configured to be filled with a liquid which occurs in a pharmaceutical production process; and the housing is at least partially lined with an elastic foam configured to reduce mechanical stress on the flexible container or the housing due to an increase in volume of the flexible container that occurs upon freezing.

78. The arrangement of claim 77, wherein the elastic foam is configured to eliminate the mechanical stress on the flexible container or the housing due to the increase in volume of the flexible container that occurs upon freezing.

79. The arrangement of claim 77, wherein the elastic foam has decreasing elasticity with decreasing temperature below a freezing point.

80. The arrangement of claim 77, wherein a hardening of the elastic foam occurs at a temperature between 0 degrees Celsius to −30 degrees Celsius.

81. The arrangement of claim 80, wherein the hardening is reversible.

82. The arrangement of claim 77, wherein a hardening of the elastic foam occurs at a temperature between −5 degrees Celsius and −25 degrees Celsius.

83. The arrangement of claim 82, wherein the hardening is reversible.

84. The arrangement of claim 77, wherein a hardening of the elastic foam occurs at a temperature between −10 degrees Celsius and −20 degrees Celsius.

85. The arrangement of claim 84, wherein the hardening is reversible.

86. The arrangement of claim 77, wherein the flexible container is completely surrounded by the elastic foam.

87. The arrangement of claim 77, further comprising:
at least one attachment for the flexible container,
wherein the flexible container and the at least one attachment are completely surrounded by the elastic foam.

88. The arrangement of claim 77, further comprising:
at least one attachment for the flexible container; and
a foam block in the housing for receiving the at least one attachment.

89. The arrangement of claim 77, wherein the housing is cuboidal.

90. The arrangement of claim 77, wherein the liquid is a medicine.

91. The arrangement of claim 77, wherein the housing comprises cover layers made of metal.

92. The arrangement of claim 91, wherein the metal is stainless steel.

93. The arrangement of claim 77, wherein the housing is completely enclosed.

94. The arrangement of claim 77, wherein the elastic foam encloses the flexible container.

95. The arrangement of claim 77, wherein the elastic foam encloses the flexible container.

96. A housing comprising:
a body configured to hold a flexible container for a liquid which occurs in a pharmaceutical production process,
wherein the housing is at least partially lined with an elastic foam configured to reduce mechanical stress on the flexible container or the housing due to an increase in volume of the flexible container that occurs upon freezing.

97. The housing of claim 96, wherein the elastic foam is configured to eliminate the mechanical stress on the flexible container or the housing due to the increase in volume of the flexible container that occurs upon freezing.

98. The housing of claim 96, wherein the elastic foam has decreasing elasticity with decreasing temperature below a freezing point.

99. The housing of claim 96, wherein a hardening of the elastic foam occurs at a temperature between 0 degrees Celsius to −30 degrees Celsius.

100. The housing of claim 99, wherein the hardening is reversible.

101. The housing of claim 96, wherein a hardening of the elastic foam occurs at a temperature between −5 degrees Celsius and −25 degrees Celsius.

102. The housing of claim 101, wherein the hardening is reversible.

103. The housing of claim 96, wherein a hardening of the elastic foam occurs at a temperature between −10 degrees Celsius and −20 degrees Celsius.

104. The housing of claim 103, wherein the hardening is reversible.

105. The housing of claim 96, wherein the elastic foam is configured to completely surround the flexible container.

106. The housing of claim 96, further comprising:
at least one attachment for the flexible container,
wherein the elastic foam is configured to completely surround the flexible container and the at least one attachment.

107. The housing of claim 96, further comprising:
at least one attachment for the flexible container; and
a foam block in the housing for receiving the at least one attachment.

108. The housing of claim 96, wherein the housing is cuboidal.

109. The housing of claim 96, wherein the liquid is a medicine.

110. The housing of claim 96, further comprising cover layers made of metal.

111. The housing of claim 110, wherein the metal is stainless steel.

112. The housing of claim 96, wherein the housing is completely enclosed.

113. The housing of claim 96, wherein the housing is configured to enclose the flexible container.

114. The housing of claim 96, wherein the elastic foam is configured to enclose the flexible container.

* * * * *